Dec. 14, 1965  W. P. REID  3,223,426
SEALING RING

Original Filed March 27, 1961  2 Sheets-Sheet 1

INVENTOR.
WILLIAM P. REID
BY Paul A. Weilein
ATTORNEY

Dec. 14, 1965 W. P. REID 3,223,426
SEALING RING
Original Filed March 27, 1961 2 Sheets-Sheet 2
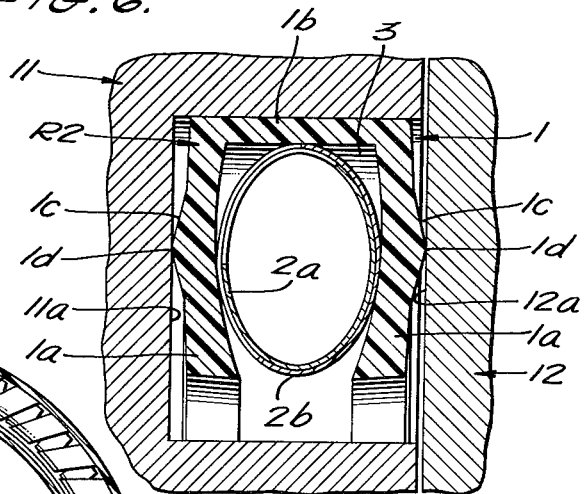
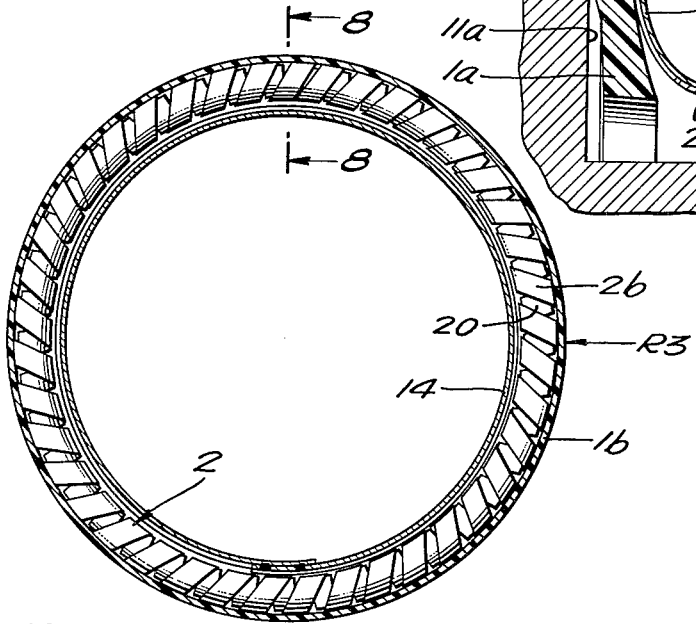
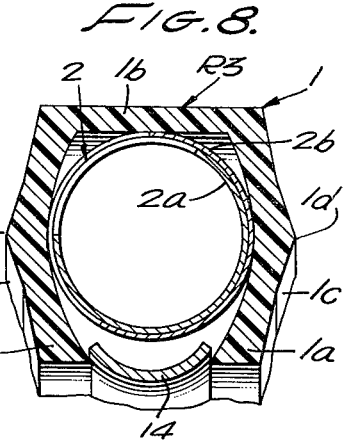
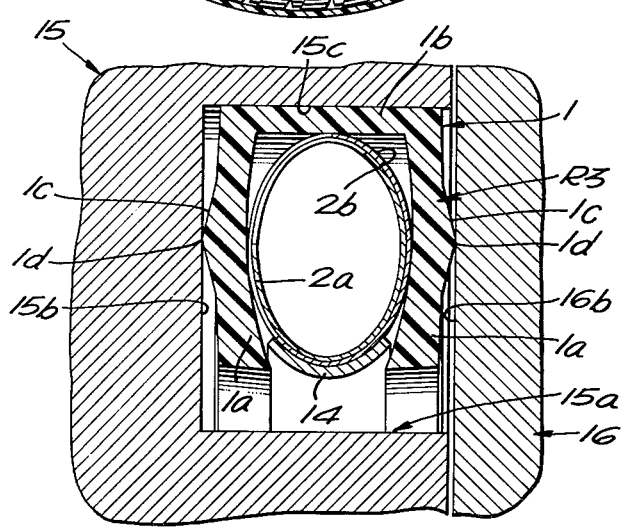
INVENTOR.
WILLIAM P. REID
BY
Paul A. Weilein
ATTORNEY

United States Patent Office 3,223,426
Patented Dec. 14, 1965

3,223,426
SEALING RING
William P. Reid, Long Beach, Calif., assignor to Aeroquip Corporation, Jackson, Mich., a corporation of Michigan
Continuation of application Ser. No. 98,439, Mar. 27, 1961. This application Aug. 3, 1964, Ser. No. 388,031
15 Claims. (Cl. 277—153)

This is a continuation of application, Serial No. 98,439, filed March 27, 1961, for Sealing Ring now abandoned.

This invention relates to sealing rings of the type for forming seals between relatively rigid curved surfaces.

It is an object of this invention to provide an improved sealing ring of the type above noted which is constructed and arranged in a novel manner to maintain a reliable seal while subjected to extremely high pressures as well as extremely high and low temperatures.

It is another object hereof to provide a sealing ring such as described that is constructed so that it will be urged into effective sealing engagement with the surfaces to be sealed, and so maintained by the fluid pressure to which the ring is exposed between the surfaces sealed by the ring.

It is a further object to provide a novel composite sealing ring wherein an annular flexible sealing jacket of channel shape in cross section is reinforced and energized by means of novel elastic tensioning or spring means arranged in tensioned engagement within the jacket to provide the desired elasticity and resist undesirable deformation thereof when exposed to extreme pressures and temperatures.

Another object is the provision of a sealing ring such as described wherein the flexible jacket of channel shape in cross section has a novel contour providing on opposite sides thereof relatively sharp sealing ridges that form knife edge type seals between the surfaces engaged thereby and are urged into effective sealing contact and so maintained by the fluid pressure within the jacket as well as by the spring means within the jacket.

An additional object is the provision of a novel composite sealing ring construction which readily lends itself to having the channel of the jacket open axially of the ring or open on the inner periphery or the outer periphery of the ring, thereby providing sealing rings different only as to the location of the open side and subject to static, rotative or linearly movable sealing applications.

Another and important object of this invention is the provision of a composite sealing ring constructed such as described which makes it possible advantageously to form the sealing jacket of a tough, durable and wear resistant plastic material having a low coefficient of friction and desired flexibility and resistance to chemical attack, for example, a polytetrafluoroethylene resin known as "Teflon" or any suitable plastic material of similar toughness and strength and capable of withstanding high pressures and temperature extremes.

Other objects and advantages of the invention will be hereinafter described or will become apparent to those skilled in the art, and the novel features of the invention will be defined in the appended claims.

Referring to the drawings:

FIG. 6 is a sectional view of the ring as formed so that the channel opens on the inner periphery of the ring and showing this ring as it would appear when positioned to form a seal between two members;

FIG. 7 is a sectional view taken circumferentially through the ring of the type shown in FIG. 6, modified by the addition thereto of an anti-shrink ring;

FIG. 8 is a cross sectional view of the ring taken on the line 8—8 of FIG. 7, on an enlarged scale; and FIG. 9 is a sectional view of the ring shown in FIGS. 7 and 8 as it would appear when installed to form a seal between two members.

Figure 1:
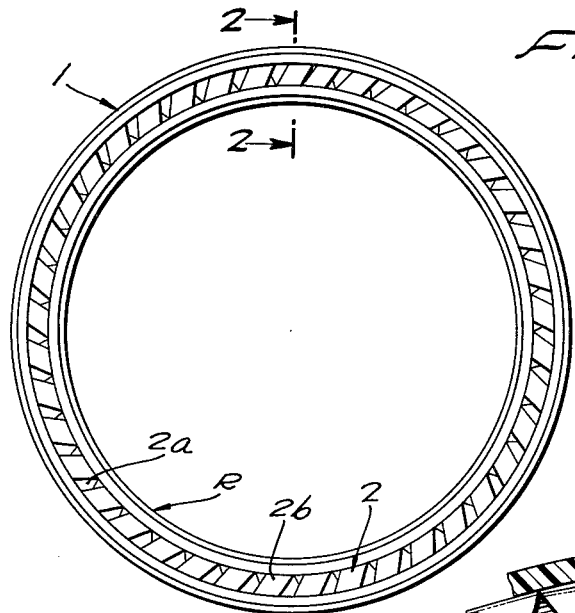
FIG. 1 is an elevational view of a sealing ring embodying the present invention as seen when looking toward the open side of the ring.

As shown in the accompanying drawings, a composite sealing ring R embodying the present invention essentially includes a flexible annular jacket 1 and an elastic or spring means 2 mounted in the jacket to reinforce and resist undue deformation thereof as well as to energize the jacket to assure reliable sealing action thereof.

The jacket 1 is formed to produce a pair of side walls 1a joined by a bottom wall 1b so as to define between these walls an annular channel or chamber 3 open circumferentially of the jacket for reception of the elastic means 2. In other words, the jacket 1 is of channel shape in cross section and therefore provides the annular channel or chamber 3 that is fully open circumferentially of the ring R. As shown in FIGS. 1–4, the jacket 1 is formed so that the channel or chamber 3 opens axially of the jacket, in other words, sidewise thereof. In this connection, it should be noted that the jacket may be formed as shown in other views of the drawings, and as will be hereinafter more fully described, so as to be open radially on the outer periphery thereof in one form, or radially on the inner periphery thereof in another form.

The side walls 1a of the jacket 1 extend substantially normal to the bottom wall 1b, which latter has a substantially flat exterior surface. The exterior surfaces of the side walls 1a are substantially flat except for annular protuberant ridges 1c located in inwardly spaced relation to the free edges of the side walls and which are beveled to define sharp sealing edges 1d.

It is preferred to form the jacket of a tough and durable and flexible plastic material, for example, a polytetrafluoroethylene resin or a similar plastic material. However, the jacket may be made of other suitable materials, provided such materials have the qualities of toughness, strength, flexibility, resistance to chemical attack and extreme temperatures and pressures comparable to that of the aforementioned plastic material. When made of this or plastic or other material, the jacket readily may be extruded, molded or machined to have the shape here shown.

The elastic or spring means 2 as here shown, is in the form of a helically coiled spring unit which may consist of one or more springs. In the present instance two springs are employed and are mounted one within the other, each being formed of a strip of flat ribbon-like spring material, for example, beryllium copper, stainless steel or other spring material. In the present instance the two springs are designated 2a and 2b and are coiled in opposite hand whereby they will provide flat surfaces which are substantially continuous circumferentially and across the springs for engaging the inner surfaces of the jacket. The springs may be joined at their ends or merely arranged to abut or interfit at their ends and each is of a length such that it will be tensioned when it is fitted in the channel 3. With this arrangement of the springs, the flat coils will resist cold flow of the plastic material of the jacket between the coils of the springs and at the same time provide resiliency and elasticity in the jacket 1, causing it to be tensioned to assure reliable sealing action. Moreover, the flat coils resist collapse more effectively than coils formed of round wire and, therefore, reliably maintain the desired elasticity and energization of the jacket to assure the desired sealing action.

Figure 2:
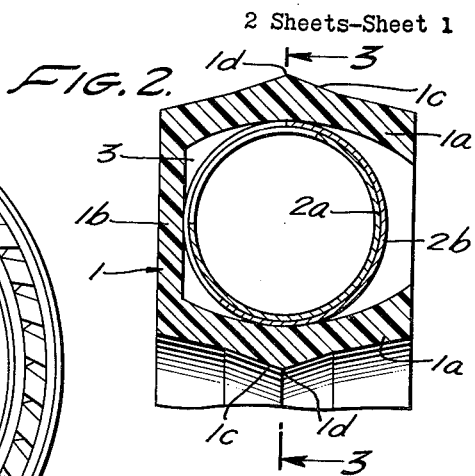
FIG. 2 is a sectional view on an enlarged scale taken on the line 2—2 of FIG. 1.

Normally, that is, before the ring R is applied to act as a seal, the spring means 2 consisting of the springs 2a and 2b, as shown in FIG. 2, is fully encompassed by the walls of the jacket and is of circular cross section, there being no part of the spring protruding outwardly through the open side of the channel or chamber 3.

Figure 4:
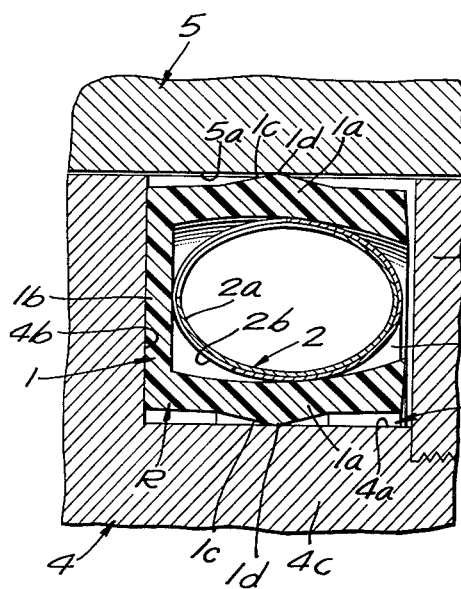
FIG. 4 is a sectional view of the ring as it would appear when installed between the surfaces of two members to form a seal thereagainst with the aid of the fluid pressure present between said surfaces.

FIG. 4 depicts one application of the ring R in connection with two members 4 and 5 having opposed relatively rigid curved surfaces 4a and 5a, for example as in a piston and cylinder. The ring R is mounted in an annular groove 4b in the member 4 so that the open side of the channel 3 in the jacket 1 is exposed to fluid pressure which, as indicated by the arrow 6, is directed between the surfaces 4a and 5a toward the open side of the jacket. With this arrangement the jacket is pressurized interiorly so as to force the sealing edge 1d on the side walls 1a against the surfaces 4a and 5a.

It will be noted that the jacket 1 is dimensioned in consideration of the size of the groove 4b and the space between the surfaces 4a and 5a so that when positioned between these surfaces in the groove 4b the side walls 1a will be compressed somewhat toward one another and the springs 2a and 2b will be deformed to the oval shape in cross section as shown in FIG. 4. Thus deformed, the springs 2a and 2b will exert a force urging the side walls 1a outwardly so that the sealing edges 1d will be maintained in effective sealing engagement with the surfaces 4a and 5a.

The ring R may be stretched a limited extent without damage so that in instances where a comparatively shallow ring-receiving groove is provided, the ring R may be stretched over an end of the member on which it is to be mounted. However, the member 4, as shown in FIG. 4, may be formed of separable sections 4c and 4d to afford access to the groove for mounting the ring therein.

It will be apparent that the ring R shown in FIGS. 1–4 and having the channel 3 open axially thereof, is well suited to form a seal between stationary members or relatively rotative members or relatively reciprocable members.

When the ring R is applied as shown in FIG. 4 with the bottom wall 1b of the jacket 1 abutting a shoulder 4e formed by the groove 4b, shrinkage of the ring that would reduce the diameter thereof and impair the sealing action is prevented.

Figure 5:
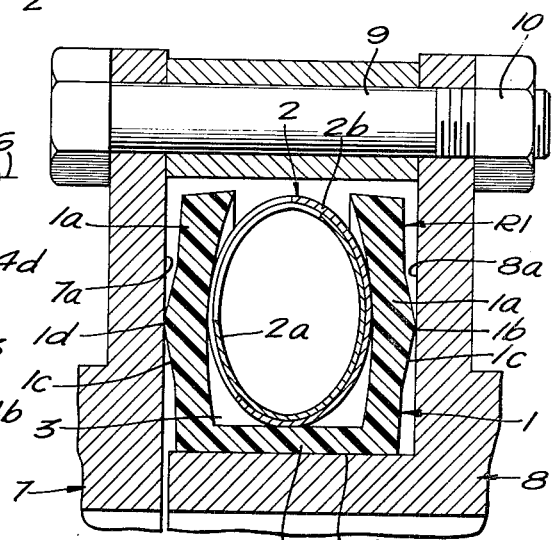
FIG. 5 is a sectional view of the ring as formed to have a channel thereof open on the outer periphery of the jacket and showing this ring as it would appear when installed to form a seal between two members.

With reference to FIG. 5, it is seen that a composite ring R1 there shown is made of the same construction as the ring R shown in FIGS. 1–4, except that the channel or chamber 3 opens axially outwardly, that is, on the outer periphery of the jacket. Accordingly, all parts of ring R1 are identified by the same reference characters as in FIGS. 1–3.

FIG. 5 shows the ring R1 as employed for forming a seal between opposed members, for example, conduits 7 and 8 in which a subatmospheric pressure or vacuum is created. In this use of the ring, the open side of the jacket 1 is exposed to the atmosphere while the two side walls 1a are disposed with their sharp edges 1d in sealing engagement with the surfaces 7a and 8a of the conduits 7 and 8. The conduits 7 and 8 are held in coupled relation with the seal R1 therebetween by means of fastenings 9 and 10. In all respects, the ring R1 is energized and seals in the same manner as the ring R shown in FIGS. 1–4. Atmospheric pressure is effective in the channel 3 to aid the springs 2a and 2b in activating the ring to form an effective seal. It should be noted that the bottom wall 1b of the ring seals against the shoulder 8b on conduit 8, thereby preventing the ring from shrinking in case it is exposed to extremely low temperatures.

Figure 3:
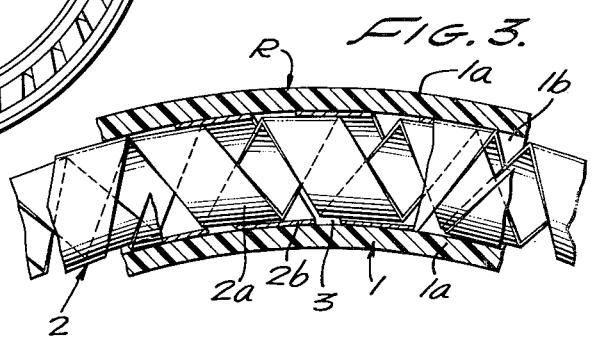
FIG. 3 is a fragmentary sectional view taken substantially on the line 3—3 of FIG. 2, on a reduced scale, to show the coiled spring means in the ring.

Referring now to FIG. 6, it will be seen that the ring R2 there shown is of the same construction as the ring shown in FIGS. 4 and 5, except that the channel 3 of the jacket 1 is open radially inwardly of the ring, in other words, on the inner periphery thereof. Accordingly, as the ring is otherwise of the same construction, the same reference characters as used in FIGS. 1–3 are applied in FIG. 6. In the application of the ring R2 as shown in this figure, the ring is interposed between members 11 and 12 such as conduits for containing fluid under pressure. The walls 1a of the ring are engaged at their sealing edges 1d with surfaces 11a and 12a of the members 11 and 12 so that the open side of the channel 3 is exposed to fluid pressure between these surfaces for activating the ring. This ring is operated to form a seal in the same manner as the ring shown in FIG. 4, by reason of fluid pressure therein and the force of the springs 2a and 2b.

Where the ring R2 is to be exposed to extremely low temperatures, such that it would shrink and reduce the diameter thereof, means are provided as an adjunct to this type of ring to prevent such shrinkage. Accordingly, in FIGS. 7, 8, and 9, there is shown a ring designated R3 which, in being of the same construction as ring R2, has the same reference characters applied thereto excepting the continuous rigid anti-shrink ring 14 which is positioned within the channel 3 so as not to close the open side of this channel. Accordingly, the anti-shrink ring 14 is concavo-convex in cross section with its concave side opposed to the springs 2a and 2b in the channel 3. When the ring R3 is not in use, it takes the form shown in FIG. 8 wherein the springs are circular in cross section and are spaced from contact with the ring 14.

With reference to FIG. 9 which shows one application of the ring R3, it will be seen that this ring forms a seal between members 15 and 16 in which the member 15 is provided with a groove 15a for reception of the ring. The side walls 1a of the ring R3 are disposed to engage the surfaces 15b and 16b of the members 15 and 16, whereas the bottom wall 1b of the jacket abuts a shoulder 15c formed by the groove 15a. Inasmuch as the anti-shrink ring 14 is positioned within the inner perimeter of the jacket 1, it will be seen that when the ring R3 is compressed upon being properly fitted in sealing position, the springs 2a and 2b will be deformed to the oval shape in abutting relation with the concave face of the ring 14 as shown in FIG. 9. With this arrangement the ring as a whole cannot shrink and cause the bottom wall 1b to be moved away from the shoulder 15c by reason of the non-yieldable continuous anti-shrink ring 14.

With reference to the foregoing description and accompanying drawings, it will be apparent that a composite sealing ring embodying this invention is subject to many and varied uses in the formaton of static, rotative, and linearly movable seals that will prove reliable over prolonged periods of time without impairment, even when exposed to extremes in temperatures and pressures. These advantages may be attributed to the use of the novel form of flexible sealing jacket of channel shape in cross section housing in the open channel thereof, the novel spring means energizing the jacket while maintaining the channel thereof open for activation by fluid pressure, all as herein provided. In this connection, it should also be noted that in the form of the invention shown in FIGS. 7, 8, and 9 where the anti-shrink ring 14 is employed, this ring does not interfere with the entry of fluid under pressure into the jacket.

Moreover, it will now be apparent that inasmuch as seal rings of the type described above, when subjected to extremely low temperatures such as those encountered in the sealing of cryogenic materials are subjected to conditions which cause material shrinkage and deformation which in prior seal constructions will render the latter inoperative, but which, in the case of the present invention, are resisted by a number of factors.

Firstly, in the case of seals per the invention to be emplyoed in cryogenic applications, the seal ring 1 should be composed of "Teflon" or other such material as previously described, since "Teflon" and such other materials are more resistant to low temperatures and thus are not as subject to embrittlement as are typical elastomeric materials.

Secondly, it will be observed that the structure of the invention provides a coiled spring which has engagement within the seal ring in such a location that a line extended diametrically across the coiled spring substantially intersects or is coplanar with the outer crests of the side walls of the seal ring, which crests, in the illustrative embodiment, are provided by the protuberant ridges 1d. The aforementioned coplanar relationship is fixed by reason of the fact that the coiled spring means abuts with the bottom wall 1b of the sealing ring or jacket 1, as clearly shown in FIG. 2.

Thirdly, it will be noted that the seal ring or jacket 1 has its side walls 1a merging with the bottom wall or end wall 1b, as the case may be in the various embodiments, so as to form at such juncture substantially right angular corners which will resist such shrinkage of the ring walls 1a as might otherwise tend to draw the crests or protuberant sealing ridges 1d out of the aforementioned coplanar relationship upon shrinkage of the ring 1 when subjected to extremely cold temperatures, and in addition, the wall 1b in the embodiment of FIG. 1, for example, is a radially flat wall whereas in the embodiments of FIGS. 5 and 6, the outer surface of the wall 1b is a cylindrical wall. In either of the latter cases, it will be observed that the outer surface of the wall 1b extends in a straight line between the corners formed at the juncture of the wall 1b with the side walls 1a.

While specific structural details have been shown and described, it should be understood that changes and alterations may be resorted to without departing from the spirit of the invention as defined in the appended claims.

I claim:

1. A composite sealing ring for use between relatively rigid surfaces, comprising: an annular flexible sealing jacket of channel shape in cross section adapted to be positioned with its open side exposed to the pressure of fluid between said surfaces; coiled spring means mounted within said jacket to resist deformation thereof; said spring means including a helically coiled spring formed of a flat ribbon-like strip of spring material whereby the coils present closely spaced wide surfaces in contact with the interior surface of said jacket; and a rigid ring disposed in said open side of said jacket in opposed relation to said spring means.

2. A composite sealing ring for use between relatively rigid surfaces, comprising: an annular flexible sealing jacket of channel shape in cross section adapted to be positioned with its open side exposed to the pressure of fluid between said surfaces; coiled spring means mounted within said jacket to resist deformation thereof; said spring means comprising a plurality of helically coiled springs each formed of a flat ribbon-like strip of spring material; said springs being coiled in opposite hand and arranged one within the other so that the coils present relatively wide surfaces in contact with the interior surfaces of said jacket; and sealing elements projecting outwardly from exterior surfaces of said jacket at points spaced inwardly from the open side of the jacket and substantially opposite said spring means.

3. A composite sealing ring for use between relatively rigid surfaces, comprising: an annular flexible sealing jacket of channel shape in cross section adapted to be positioned with the open side of the channel thereof exposed to the pressure of fluid between said surfaces; spring means mounted within said jacket to resist deformation thereof; and a continuous rigid ring mounted in the mouth of said channel to restrain distortion of said spring means.

4. A composite sealing ring for use between relatively rigid surfaces, comprising: an annular flexible sealing jacket of channel shape in cross section adapted to be positioned with the open side of the channel thereof exposed to the pressure of fluid between said surfaces; spring means mounted within said jacket to resist deformation thereof; said open side of said channel being disposed at the inner periphery of said jacket; and a continuous rigid ring mounted in said open side of said channel and opposite said spring means in position to be engaged by said spring means upon deformation of said spring means.

5. In a composite sealing ring: an annular flexible jacket of channel shape in cross section wherein the channel opens on the inner perimeter of said ring; helically coiled spring means mounted in said channel for engagement with interior surfaces of said jacket; and a rigid ring mounted in said channel opposite said coiled spring means so as to be engageable by said spring means.

6. A composite sealing ring for use between relatively rigid surfaces, comprising: an annular flexible sealing jacket of channel shape in cross section adapted to be positioned with its open side exposed to the pressure of fluid between said surfaces; coiled spring means mounted within said jacket for engagement therewith to resist deformation thereof; said spring means comprising a plurality of helically coiled springs each formed of a flat ribbon-like strip of spring material; said springs being coiled in opposite hand and arranged one within the other so that the coils present relatively wide surfaces in contact with the interior surfaces of said jacket; and a rigid ring mounted in the mouth of the channel of said jacket in opposed relation to said springs in position to be engaged by said springs.

7. A composite sealing ring for sealing against the opposed surfaces of opposed members, comprising: an annular jacket of a flexible material formed to provide a pair of spaced, opposed side walls and a third wall extending between and joining said side walls, said walls defining interiorly of the jacket an annular chamber open at one side throughout the jacket, and each of said two side walls having an end face and an outer face joined to form an edge at the terminal portion of each side wall adjacent the open side of the jacket; an annular protuberant portion on said outer face of each side wall forming a sealing ridge; and coil spring means within the annular chamber to resist deformation of the jacket, said spring means having central portions at opposite sides thereof engaging said two spaced walls and maintained in positions directly inwardly by the sealings ridges to apply compressive force through the walls directly to the ridges, the sealing ridges being spaced from the edges at said terminal portions; said terminal portions being laterally unsupported.

8. A composite sealing ring as claimed in claim 7 in which said spring means includes a helically coiled spring formed of a flat ribbon-like strip of elastic material whereby the spring presents closely spaced wide surfaces in contact with the inner surfaces of the jacket.

9. A composite sealing ring as claimed in claim 7 in which the jacket is made of substantially non-elestomeric plastic material.

10. A composite sealing ring for sealing against the opposed surfaces of opposed members, comprising: an annular jacket of a flexible material formed to provide a pair of spaced, opposed side walls and a third wall extending between and joining said side walls, said walls defining interiorly of the jacket an annular chamber open at one side throughout the jacket, and each of said two side walls having on an end face and an outer face joined to form an edge at the terminal portion of each side wall adjacent the open side of the jacket; an annular protuberant portion on said outer face of each side wall forming a sealing ridge; and spring means within the annular chamber in engagement with said side walls to resist deformation of the jacket, said spring means having central portions at opposite sides thereof engaging said two spaced walls at positions directly inwardly of and in coplanar relationship with the sealing ridges to apply compressive force through the walls directly to the ridges, the sealing ridges being spaced from the edges at said terminal portions; said terminal portions being laterally unsupported.

11. A composite sealing ring for sealing against the opposed surfaces of opposed members and for engagement with a surface extending between said members and adapted to be subjected to extremely low temperatures, comprising: an annular jacket of non-elastomeric plastic material having a pair of spaced opposed walls interconnected by a third wall; said walls defining interiorly of the jacket an annular chamber open at one side; each of said side walls having an end face and an outer face joined to form an edge at the terminal portion of each side wall adjacent the open side of the jacket; a relatively narrow annular sealing portion on said outer face of each side wall for sealing engagement with said surfaces of said members; coil spring means within the chamber to resist deformation of the jacket; said coil spring means being normally of generally circular cross section and having diametrically opposite portions contacting the inside of said opposed walls in coplanar relationship to said relatively narrow annular sealing portions; and said relatively narrow sealing portions being located inwardly from said edges at said terminal portions so that said terminal portions are laterally unsupported.

12. A composite sealing ring as defined in claim 11, wherein said side walls and said third wall join in substantial right angular relationship and form corners supporting said side walls against shrinkage circumferentially of said spring means, and said third wall has an outer surface extending in a straight line between said corners and engageable with said surface extending between the opposed surfaces of said members.

13. A composite sealing ring as defined in claim 12, wherein said coil spring means is in abutting engagement with said third wall to fix the coplanar relationship aforesaid.

14. A composite sealing ring as defined in claim 11, wherein said spring means consists of a coil of flat ribbon-like spring material the coils of which are in closely spaced relation.

15. A composite sealing ring as defined in claim 11, wherein said spring means comprises a pair of coil springs of opposite hand disposed one within the other.

References Cited by the Examiner

UNITED STATES PATENTS

| | | | |
|---|---|---|---|
| 2,932,535 | 4/1960 | Peickii et al. | 277—183 |
| 2,934,368 | 4/1960 | Adamson | 277—153 |
| 3,104,884 | 9/1963 | Kerlin | 277—206 |
| 3,129,021 | 4/1964 | Willis et al. | 277—205 X |

FOREIGN PATENTS

| | | |
|---|---|---|
| 858,621 | 12/1952 | Germany. |
| 811,835 | 4/1959 | Great Britain. |
| 232,193 | 8/1944 | Switzerland. |

LEWIS J. LENNY, *Primary Examiner.*

SAMUEL ROTHBERG, *Examiner.*